Aug. 30, 1949.  J. GÉRENTÉS  2,480,291
ELECTRIC MOTOR AND BRAKE UNIT
Filed Aug. 30, 1945
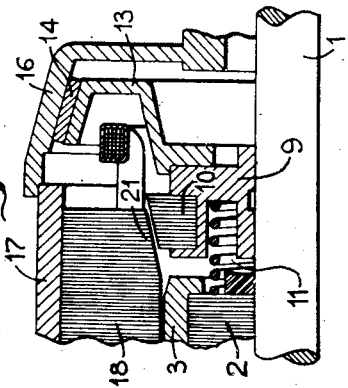
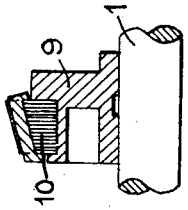
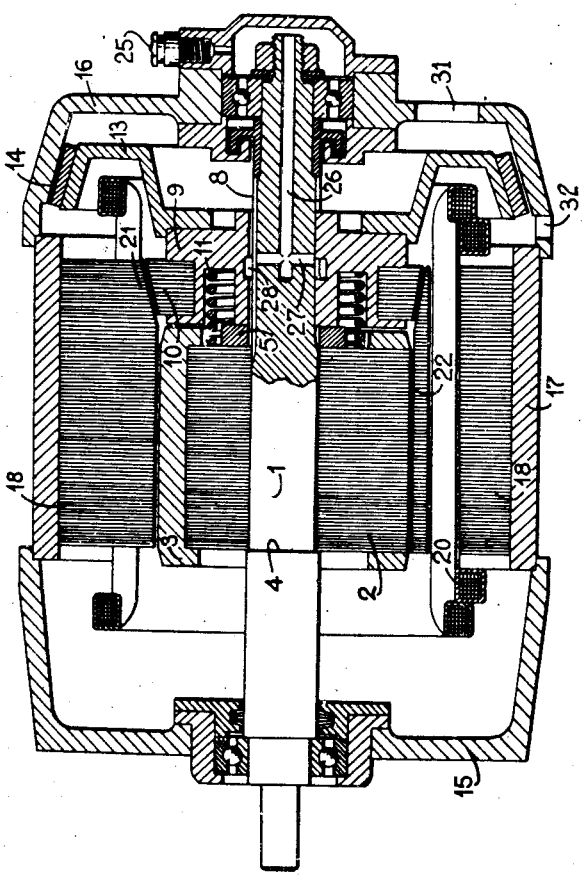
INVENTOR
JEAN GERENTES
By Richardson and David
Att'ys Patented Aug. 30, 1949

2,480,291

UNITED STATES PATENT OFFICE 2,480,291

ELECTRIC MOTOR AND BRAKE UNIT

Jean Gérentés, Saint-Etienne, France, assignor to Constructions Electro-Mechaniques de Saint-Etienne "Ancienne Usine Wageor," Paris, France Application August 30, 1945, Serial No. 613,625
In France November 8, 1943

Section 1, Public Law 690, August 8, 1946
Patent expires November 8, 1963

2 Claims. (Cl. 172—36)

This invention relates to electric motor and brake units, wherein the brake is adapted to automatically stop the rotor as soon as the electric current is cut off and to release the rotor as soon as the motor is again energized, whereby the latter starts normally.

In known devices of this kind, various means have been devised for the control of the brake: control by means of a special electro-magnet, connected with the supply terminals of the motor, or by an axial shifting of the rotor assembly, which centers itself in the magnetic circuit of the stator, or by means of various devices operated by the magnetization of the rotor or the stator, or devices using the rotary field produced by the stator. All these devices have their own particular drawbacks: large overall size, complicated construction, causing frequent breakdowns, alteration of the electro-mechanical characteristics of the motor, etc.

The invention has for its object to remedy as much as possible the drawbacks of these known devices, and, with this object in view, the motor and brake unit according to the invention comprises a braking member slidably keyed to the motor shaft, and integrally with a magnetic core, forming a rotor element separated from the stator by an air gap which varies in accordance with the position of said braking member along the motor shaft, and a return spring adapted to bring the braking member into its operative position when the current is cut off, said operative position corresponding to the largest air gap, the tension of said spring being such as to be overcome by the attraction exerted by the stator on the magnetic core when the motor is reenergized, in order to release the brake.

Further features of the invention will be apparent from the following description, with reference to the accompanying drawings which are given solely by way of an example, and in which:

Fig. 1 is a longitudinal section of the motor and brake-unit in the running position.

Fig. 2 is a partial corresponding view showing the brake in its operative position, and Fig. 3 is a partial longitudinal section of a modification.

Referring to Fig. 1, 1 denotes the motor shaft, 2 the laminated core of the rotor and 3 a squirrel cage cast on said core, the latter being held against a shoulder 4 of shaft 1 by means of a ring 5. Shaft 1 is provided with longitudinal flutes 8 on which a sleeve 9 is adapted to slide, said sleeve carrying a laminated core 10, whose periphery is made conical. A return spring 11, bearing against rotor 2, tends to shift sleeve 9 towards the right, as shown in the drawings. To said sleeve is secured a plate 13, made of a light alloy and whose conical rim is provided with a lining 14 made of a substance having a high coefficient of friction. Shaft 1 is supported, through the medium of ball bearings, in two end plates 15 and 16, axially mounted on the stator frame 17.

The stator comprises a laminated core 18 provided with wide opened grooves in order to reduce the self-induction, said grooves accommodating as usual the winding coils 20. These are located at a slightly greater distance from the air gap than usual, due to the provision of a conical bore 21, extending at one end of the cylindrical bore 22 of the stator. Said conical bore has the same angle as the conical surface of the laminated bore 10.

End plate 16 is provided with a conical flange, the inner surface of which has the same angle as the conical surface of plate 13. The assembly consisting of sleeve 9, core 10 and plate 13 with its lining 14 is rotated by shaft 1, owing to the flute connection 8, and it can occupy two positions on said shaft. In the idle position shown in Fig. 1, in which sleeve 9 engages with stop ring 5, the air gap between core 10 and the conical bore 21 of the stator is a minimum; in the operative position shown in Fig. 2, sleeve 9 has been shifted towards the right until the lining 14 of plate 13 engages the inner conical wall of end plate 16.

Lubrication of sleeve 9 on shaft 1 and of the adjacent ball bearing is ensured by an oiler 25 and a longitudinal duct 26, extending through the shaft and opening into a transverse duct 27, opening itself into a groove 28 of sleeve 9. The other structural details of the motor are as usual.

The operation is as follows:

The motor being at rest (Fig. 2), lining 14 is pressed against the inner wall of end plate 16 under the action of spring 11 and sleeve 9 occupies its end position towards the right.

As soon as the motor is energized, laminated core 10 is attracted by the conical portion 21 of stator 18, against the action of spring 11 (Fig. 1), and sleeve 9 is shifted towards the left, together with plate 13, which is thus disengaged from end plate 16. The rotor being no longer braked, it starts rotating normally and no change occurs so long as the motor remains under tension.

As soon as the current is cut off, core 10 is no longer attracted by stator 18 and is pushed back abruptly towards the right by spring 11, which causes engagement of plate 13 with end plate 16 and strong braking of the rotor. The latter will remain stationary until the motor is again energized.

Openings 31 and 32, provided in end plate 16, ensure a circulation of air driven by the centrifugal action occurring during the rotation of plate 13. This air circulation assists the elimination of dust resulting from the desintegration of the friction lining 14.

The starting torque may be largely varied depending upon the type of rotor adopted. When the core 10 is a simple laminated magnetic mass, the force of attraction acting thereon is very high and the starting torque is a minimum; said torque can be varied, either by providing said core with a squirrel cage of variable resistance, as shown in Fig. 3, or by providing rotor 2 with a double cage winding or by using a rotor having collector rings and provided with starting resistances in a conventional manner. By combining these different methods, great smoothness in starting and perfect progressivity in braking may be attained.

Obviously, the invention is in no wise limited to the embodiments shown and described, as these have been given only as examples.

For example, the braking member may consist of a set of discs alternating with stationary discs, one set of discs being optionally lined with a substance having a high coefficient of friction.

Having now described my invention what I claim as new and desire to secure by Letters Patent is:

1. In an electric motor and brake unit, a stator, the bore of which comprises a cylindrical portion and a conical end portion, a main rotor unmovably keyed on the shaft and rotating in said cylindrical portion of said bore, a slidably keyed armature having a lamination pack of conical profile and rotating in said conical end portion of said bore, said armature being magnetically independent of said main motor and adapted to be directly actuated by the magnetic attraction of said conical end portion, a stationary frame, a braking member cooperatively connected with said armature and adapted to cooperate with said frame to brake said armature and said shaft, and a return spring adapted to oppose the magnetic attraction exerted by said stator upon said armature.

2. An electric motor and brake unit as claimed in claim 1, wherein said slidably keyed armature is provided with a squirrel cage.

JEAN GÉRENTÉS.

REFERENCES CITED

The following references are of record in the file of this patent:

UNITED STATES PATENTS

| Number | Name | Date |
|---|---|---|
| 1,226,091 | McCollum | May 15, 1917 |
| 1,932,970 | Howe | Oct. 31, 1933 |

FOREIGN PATENTS

| Number | Country | Date |
|---|---|---|
| 468,826 | Great Britain | July 13, 1937 |
| 491,469 | Great Britain | Sept. 2, 1938 |
| 664,822 | Germany | Sept. 7, 1938 |